3,231,468
DEXAMETHASONE-CYPROHEPTADINE ORAL ANTIFLAMMATORY COMPOSITIONS

Thomas J. Macek, Glenside, and Carl E. Nelson, Hilltown, Pa., assignors to Merck & Co. Inc., Rahway, N.J., a corporation of New Jersey
No Drawing. Filed July 2, 1962, Ser. No. 207,035
4 Claims. (Cl. 167—55)

This invention relates to pharmaceutical preparations and particularly to a combination of therapeutic agents for the treatment of corticoid-responsive syndromes.

In its broad concept the invention contemplates pharmaceutical preparations which contain both an anti-inflammatory corticosteroid and an agent which is active as an antiserotonin. A preferred steroid is dexamethasone and a preferred antiserotonin is cyproheptadine, but other agents having their respective therapeutic activities may be employed, as will be explained.

The importance of this combination resides in the discovery that the addition of the antiserotonin unexpectedly reduces the required amount of the corticosteroid. The presence of the antiserotonin in the combination may be said to have a "steroid sparing" effect in that the same beneficial therapeutic effect is obtained with a smaller amount of steroid than would be required if the antiserotonin were absent.

The antiinflammatory corticosteroids have well recognized utility in a host of human ailments such as bronchial asthma, various allergies and dermatoses but it is also known that their use often is accompanied with undesirable side reactions. The patient taking one of these steroids secures welcome relief from the principal ailment for which the steroid is indicated, but the undesirable physiological reactions which are elicited frequently are so severe that the dosage of the steroid has to be reduced to an insufficient amount. These adverse side reactions include adrenocortical insufficiency; protein catabolism with negative nitrogen balance; osteoporosis; activation and complications, including perforation and hemorrhage of peptic ulcer; aggravation of infection; increased blood pressure; rounding of the face; hirsutism; acne; abdominal striae; petechiae and purpura; amenorrhea; insomnia; and psychic disturbances.

For example, many dermatoses are not improved by any treatment other than a steroid such as dexamethasone. The dermatoses which are particularly distressing are those which involve excessive itching such as dermatitis, venenata, seborrheic dermatitis repens, erythema multiforme and purpitic pityriasis rosea. Although the antiinflammatory corticosteroids offer the therapeutic treatment of choice, the accompanying side effects are often intolerable as one or more of the adverse symptoms enumerated above will appear.

An important feature of the present combination is that it unexpectedly makes possible a reduction in the amount of steroid required and, thereby, a reduction or elimination of the side effects which otherwise would emerge. Although the antiserotonin to be administered with the steroid, in accordance with the present invention, is not a steroid itself, it exerts what may be called a steroid sparing phenomenon in that a smaller amount of the steroid can be administered than would be required if the steroid alone were administered.

The preferred corticosteroid is the known dexamethasone and especially its phosphate, but the invention contemplates as well cortisone, hydrocortisone, and their various known derivatives such as 9α-fluoro-11β,17α-dihydroxyprogesterone, 9α - fluoro - 11 - keto-17α-hydroxyprogesterone, the Δ¹ analogs, such as 11β,17α,21-trihydroxy-1,4-pregnadiene-3,20-dione and its esters; the 2-methyl derivatives such as 2-methyl-11β,17α,21-trihydroxy-4-pregnene-3,20-dione 2 - methyl-11β,17α,21-trihydroxy-1,4 - pregnadiene-3,20-dione-17α,21-dihydroxy-1,4-pregnadiene-3,11,20-trione and their esters such as the acetates, hemisuccinates and the phosphates.

The preferred antiserotonin is cyproheptadine which is disclosed and claimed in Patent 3,014,911, but the other compounds covered by the patent may as well be used.

If cyproheptadine and dexamethasone, which are the preferred ingredients, are to be compounded in tablet form each tablet preferably would contain 4 mg. of cyproheptadine and 0.25 mg. of the dexamethasone. However, the tablet could contain from 2 mg. to 6 mg. of cyproheptadine and from 0.15 to 0.50 mg. of dexamethasone. This same range and preferred amounts would apply if the ingredients were to be put up in capsule form.

If cyproheptadine and dexamethasone were to be made up in liquid form for use they should be in such concentration that one, two or three teaspoonfuls of the liquid would supply the active ingredients within the above range and preferably in the amounts stated to be preferred. In liquid form it would be desirable that the dexamethasone be present as the phosphate or acetate or other soluble form.

These pharmaceutical tablets, capsules and liquids would be prepared by conventional manufacturing techniques. The usual flavoring agents and adjuncts would be employed.

If instead of cyproheptadine, another one of the compounds claimed in Patent 3,014,911 is used, the same range of its use would be employed, i.e., in at least a therapeutically effective amount. If instead of dexamethasone, another antiinflammatory steroid is substituted, the amount to be used would be based on its known activity relative to dexamethasone. Thus, if the substituted steroid is prednisone which is about one-sixth as active as dexamethasone, six times as much of it would be used in the formulation.

The examples which follow will serve to further illustrate the invention.

Example I

Compressed tablets are made as follows:

| Ingredients used: | Weight for 100 tablets |
|---|---|
| Dexamethasone | mg__ 25.0 |
| Cyproheptadine | mg__ 400.0 |
| Lactose powder | gm__ 14.3 |
| Calcium phosphate | gm__ 3.2 |
| Starch, potato | gm__ 2.0 |
| Magnesium stearate | gm__ 150.0 |
| Distilled water Q.S. to granulate. | |

The dexamethasone, cyproheptadine, lactose powder, calcium phosphate and starch are combined and mixed together for 10 minutes, after which the material is put through a high speed comminutor and again mixed for 10 minutes. Enough water is added for granulation and the granulation is obtained by passage through a slow speed comminutor. The granulation is placed on a tray and dried at about 115° C. for about 10 hours. After again comminuting at a medium speed the magnesium stearate is added and the ingredients are mixed. The mixture is then compressed into 100 tablets so that each contain 0.25 mg. of dexamethasone and 4.0 mg. of cyproheptadine.

Example II 100 tablets are made as in Example I but 200 mg. of cyproheptadine is used.

Example III 100 tablets are made as in Example I but 600 mg. of cyproheptadine is used.

Example IV

In like manner tablets containing more or less of the dexamethasone within the range above specified are made. An initial dosage would involve one tablet, three times a day, containing 0.25 mg. of dexamethasone and 4 mg. of cyproheptadine, and it would be increased or decreased according to the need of the patient as judged by the physician. Or the physician may elect to change to a tablet within the ranges defined above, having in mind that the smallest amount of dexamethasone administered over the day is to be established by observed titration of the patient. This enables the physician to take fullest advantage of the steroid sparing effect of the steroid-antiserotonin combination of the invention.

What is claimed is:

1. A pharmaceutical preparation for oral administration in unit dosage form comprising dexamethasone and cyproheptadine, the cyproheptadine being present in a therapeutically effective amount, the dexamethasone being present in a smaller amount than would be required if the anti-serotonin were absent.

2. A pharmaceutical preparation for oral administration in unit dosage form comprising from 0.15 to 0.50 mg. of dexamethasone and from 2 to 6 mg. of cyproheptadine.

3. A pharmaceutical preparation for oral administration in unit dosage form comprising 0.25 mg. of dexamethasone and from 2 to 6 mg. of cyproheptadine.

4. A pharmaceutical preparation for oral administration in unit dosage form comprising 0.25 mg. of dexamethasone and 4 mg. of cyproheptadine.

References Cited by the Examiner

UNITED STATES PATENTS 3,014,911  12/1961  Engelhardt _____ 167—65 X
3,053,737   9/1962  Johnson _____ 167—77

OTHER REFERENCES

Arbesman et al., J. Allergy, 29 (3), pp. 242–248, May 1958.

Drug Trade News, July 24, 1961, 36 (15), pp. 43, 62.

Fox, J. Am. Med. Assn., 169 (12), p. 198/1388, Mar. 21, 1959.

Grayson et al., "Use of Cyproheptadine and Cyproheptadine-Dexamethasone Combination in Dermatologic Disorders," Clinical Medicine, pp. 713–16, April, 1964.

New and Non-Official Drugs, 1960, pp. 36–37.

Rosenkrantz, Endocrinology, vol. 64, pp. 355–362, March 1959.

Sperber, "Cyproheptadine-Dexamethasone Combination in the Treatment of Pruritus," Curr. Therap. Res., 4, pp. 70–4, February 1962.

Stone et al., J. Pharmacol. and Exp. Therapeutics, 131(1), January 1961, pp. 73–84.

Welsh et al., "Studies of Cyproheptadine Combined With Dexamethasone," The Journal of New Drugs, 2(4), pp. 223–31, July–August 1962.

FRANK CACCIAPAGLIA, JR., *Primary Examiner.*